United States Patent [19]
Mattson, Jr. et al.

[11] Patent Number: 5,911,073
[45] Date of Patent: Jun. 8, 1999

[54] METHOD AND APPARATUS FOR DYNAMIC PROCESS MONITORING THROUGH AN ANCILLARY CONTROL CODE SYSTEM

[75] Inventors: James S. Mattson, Jr., Campbell; Lacky V. Shah, Sunnyvale; William B. Buzbee, Half Moon Bay, all of Calif.

[73] Assignee: Hewlett-Packard Company, Palo Alto, Calif.

[21] Appl. No.: 08/996,963

[22] Filed: Dec. 23, 1997

[51] Int. Cl.⁶ .................................................. G06F 9/445
[52] U.S. Cl. ............................................................ 395/701
[58] Field of Search .................................... 395/701, 704, 395/183.11, 183.04, 678, 652, 183.14, 712

[56] References Cited

U.S. PATENT DOCUMENTS

| | | | |
|---|---|---|---|
| 4,071,744 | 1/1978 | Pollock | 364/164 |
| 5,193,180 | 3/1993 | Hastings | 395/710 |
| 5,313,616 | 5/1994 | Cline et al. | 395/500 |
| 5,335,344 | 8/1994 | Hastings | 395/183.11 |
| 5,335,491 | 8/1994 | Lawlor et al. | 60/39.37 |
| 5,339,430 | 8/1994 | Lundin et al. | 395/685 |
| 5,367,685 | 11/1994 | Gosling | 395/707 |
| 5,369,766 | 11/1994 | Nakano et al. | 395/685 |
| 5,381,534 | 1/1995 | Shi | 395/200.33 |
| 5,410,703 | 4/1995 | Ericsson | 395/712 |
| 5,414,855 | 5/1995 | West | 395/708 |
| 5,442,790 | 8/1995 | Nosenchuck | 395/707 |
| 5,452,457 | 9/1995 | Alpert et al. | 395/709 |
| 5,487,158 | 1/1996 | Amelina et al. | 395/705 |
| 5,504,914 | 4/1996 | Lai | 395/567 |
| 5,519,866 | 5/1996 | Lawrence et al. | 395/710 |
| 5,522,036 | 5/1996 | Shapiro | 395/183.14 |
| 5,522,072 | 5/1996 | De Bruler | 395/684 |
| 5,535,329 | 7/1996 | Hastings | 395/183.11 |

(List continued on next page.)

OTHER PUBLICATIONS

Bob Cmelik & David Keppel, "Shade: A Fast Instruction–Set Simulator For Execution Profiling", Sigmetrics 94, May 1994, Santa Clara, CA USA 1994, pp. 128–137.

"Daisy: Dynamically Architected Instruction Set From Yorktown", IBM Corporation, 1996, 2 pages.

"Digital FX!32", Digital Semiconductor, 3 pages.

Matt Pietrek, "Learn System—Level Win32 Coding Techniques By Writing An API Spy Program", Systems Journal, Dec. 94', pp. 17–44.

R. Sites, et al., "Binary Translation", Communications Of The ACM, Feb. 93', vol. 36, No. 2, pp. 69–81.

Eric Traut, "Core–Building The Virtual PC", Byte, Nov. 97', pp. 51–52.

Harry J. Saal & Zui Weiss, "A Software High Performance APL Interpreter", IEIE–IEIE, vol. 9, Issue 4, 1979, pp. 74–81.

Ronald L. Johnston, "The Dynamic Incremental Compiler Of APL/3000", IEIE–IEIE, vol. 9, Issue 4, 1979, pp. 82–87.

Kemal Ebcioglu & Erik R. Altman, "DAISY: Dynamic Compilation For 100% Architectural Compatibility", IBM Research Report, RC 20538, Aug. 5, 1996, Computer Science, pp. 1–82.

Reed Hastings 7 Bob Joyce (Pure Software, Inc.), "Purify: Fast Detection Of Memory Leaks And Access Errors", USENIX—Winter 92', pp. 125–136.

*Primary Examiner*—Tariq R. Hafiz
*Assistant Examiner*—Chameli C. Das

[57] ABSTRACT

A method and apparatus for improving the process of software development by a dynamic software development tool. The present invention allows the execution of an emulation tool to occur under the control of the original user process and preserves the execution flow of the user process instructions. The present invention manages the execution of the emulation tool within the computer memory. The present invention uses the user process code as data to direct the execution of the emulation tool. The present invention enables the use of other software development tools such as monitoring and profiling tools, program analysis tools, simulation tools, and software debugging tools.

18 Claims, 7 Drawing Sheets

U.S. PATENT DOCUMENTS

| | | | |
|---|---|---|---|
| 5,548,794 | 8/1996 | Yishay et al. | 395/871 |
| 5,581,695 | 12/1996 | Knoke et al. | 395/183.04 |
| 5,581,697 | 12/1996 | Gramlich et al. | 395/183.11 |
| 5,583,988 | 12/1996 | Crank et al. | 395/185.01 |
| 5,590,331 | 12/1996 | Lewis et al. | 395/708 |
| 5,606,697 | 2/1997 | Ono | 395/707 |
| 5,625,832 | 4/1997 | Ohsawa et al. | 395/800.28 |
| 5,627,981 | 5/1997 | Adler et al. | 395/582 |
| 5,628,016 | 5/1997 | Kukol | 395/704 |
| 5,652,884 | 7/1997 | Palevich | 395/651 |
| 5,655,121 | 8/1997 | Delagi et al. | 395/704 |
| 5,740,440 | 4/1998 | West | 395/704 |

METHOD AND APPARATUS FOR DYNAMIC PROCESS MONITORING THROUGH AN ANCILLARY CONTROL CODE SYSTEM

FIELD OF THE INVENTION

The present invention relates to software development tools and more particularly, to dynamic instrumentation, emulation, profiling, and monitoring tools that aid in the development and maintenance of computer software.

BACKGROUND OF THE INVENTION

Developing and maintaining computer software has long been recognized as a difficult and error prone technology. Developers of application software and software integrators have sought compiler technology tools which provide instrumentation capabilities to optimize their software. Problems such as determining when memory array boundary conditions have been exceeded or when memory is uninitialized in the C and C++ programming languages have continued to exist and the need for improvements in software program monitoring tools is prevalent.

One problem with prior art software development tools is that such tools use a static process for adding instrumentation and monitoring code instructions. The use of a static process changed the execution of the object module from the way the object module would have originally executed to a new execution flow. Other processes used by static instrumentation or monitoring tools have expanded the user's original object code by adding steps to the software loading process by methods such as the insertion of instrumentation by a debugger, or of software fixes by adding patched code. The additional instrumentation and monitoring code allows the program under execution to track things such as memory boundary conditions, cache simulation, and software program flow. Software analysis for purposes such as code profiling is sometimes called code debugging. The patched code is used for purposes such as inserting software maintenance changes into object code modules. Since the original loader process is augmented to include a debugger or a code patching feature the executable memory image may contain the instrumentation code that was added during the augmented loading process.

In the previous types of software development tools such as computer instrumentation and monitoring tools, the translation of the original code occurs either on the original media image or at the point that the loader is invoked. After computer instrumentation and monitoring there no longer exists an executable image of the user's original code. Therefore, prior art limited the way the software development tools were used by altering the user's executable image with inserted instrumentation or monitoring code and thereby required the program counter to traverse both the user's original code instructions and the inserted instrumentation or monitoring code instructions.

All of these techniques for the use of static software development tools, which have existed in the past, have problems that have limited their efficiency. For instance, static instrumentation or monitoring tools require special linking. Additionally, since the type and scope of instrumentation needs may vary depending on particular program behavior at execution, in order to use a static instrumentation or monitoring tool effectively the user would need to periodically stop and look at the state of the optimized code, building up a history by using a series of code snapshots. These are time consuming activities.

Also, the static instrumented object code module does not include run-time information and consequently instrumentation or monitoring code will insert instructions for all paths of the software code even though many paths will not become part of the actual execution process. The lack of knowledge of the actual execution path of the user's object code module additionally hampers the programmer's ability to use the software development tools of the past with dynamically loadable libraries, such as the C language dll library. The user would have to speculate at compile-time as to which dynamically loadable libraries would be included during the execution of the user's code and this may result in unnecessary code generation.

From the foregoing it will be apparent that there is still a need to create software development tools that retain the original execution flow of the user's code. This need exists because existing software development tools do not include run-time information and therefore efficiencies related to inserting instrumentation which is focused on the actual user code execution path cannot be achieved. Also, the run-time options chosen by the user cannot be propagated to the instrumented code in past dynamic tools. This results in less efficient means of instrumenting code. More recently a few dynamic tools have been developed that alter the monitoring code but still do not solve these problems.

These and other problems with the past static and dynamic software development tools have resulted in limitations on the further development of software development techniques.

SUMMARY OF THE INVENTION

The present invention, a software development tool, is a form of dynamic instrumentation or monitoring and executes under the same environment as that of an instrumented or monitored user process. The present invention creates an environment that allows dynamnic instrumentation or monitoring to be introduced at run-time and thereby takes advantage of the maximum amount of information about the execution of a user process. For instance, the tool alleviates the need for re-compilation or re-linking by software developers, as the instrumentation or monitoring changes will occur at run-time. Additionally, since the tool executes under the user process environment it preserves the flow of execution of the user code.

Emulation is the process of substituting machine instructions for the user's original machine instructions. The emulation process performs the equivalent operations that the user would have performed and also includes the desired instrumentation operations.

Static software development tools can also provide support for tracing a program's instruction execution. For instance, code could be written to test the process memory trace for detection of uninitialized code access. Further, access to memory reference buffers could be created and memory-sensitive procedures such as malloc, which supports memory allocation in a C language library environment, could be substituted via instrumentation. Substitution may consist of replacing machine instructions or of adding machine instructions. Therefore, the static tool can catch memory buffer accessing system calls prior to their execution and record their behavior. Code could be added to display the results of this instrumentation.

The present invention is a software development tool that makes use of an original disc-based image of user code, that is augmented by the computer system loader, a bootstrap loader, and a state value loader. The present invention also uses ancillary control code that emulates the user process instructions by executing equivalent instructions, and instruments the emulated user process instructions by adding instructions. The present invention may use a process controller that manages the software development tool and the user process in computer memory and can suspend and resume execution of the user process.

The ancillary control code may be an object code module that is attached to the user process when the tool is executing, that maintains computer system environment information in memory, and that executes according to the control flow of the user executable code. The in-memory copy of the state of the executing program includes among other things, the machine state of registers, condition codes, and hardware-specific parameters. The present invention may use a memory state loader to load into a temporary location, and later re-load, program execution state information which may be used by the bootstrap code and the ancillary control code.

In the present invention the instrumented or monitored instructions execute in the same memory space that was allocated for the user process and use the original code as directives, in the form of data, to lead the instrumented instructions through the same execution flow as in the original user process. Therefore, the present invention is not limited in the way prior tools were limited by the practice of altering the user's executable image with inserted instrumentation or monitoring code that required the program counter to traverse both the user's original code instructions and the inserted instrumentation or monitoring code instructions.

The ancillary control code includes an emulator that substitutes the user process instructions and maintains computer system environment information that the user process would have generated, that causes the modified user process to produce the same results as if the emulation tool had not been invoked, and that treats the user process code as data. The ancillary control code includes an instrumentor that executes within the user process and adds instructions which may augment the user instructions for purposes such as monitoring or profiling. Finally, the ancillary control code may include an executor that determines whether the emulator or the instrumentor is invoked by using the instructions of the user process and treating the instructions as data. The substitution instructions are equivalent to the user's code instructions but may include additional process monitoring or instrumentation code instructions. The ancillary control code is dependent on the specific computer hardware and the specific computer operating system on which it executes.

The present invention can be used to facilitate the creation of a number of valuable program analysis tools for software development and maintenance. For example memory leak detection, for problems with procedures such as malloc and free, is an important function which allows a user to increase software development and maintenance efficiency. Free is an operating system command that supports de-allocation of memory and is contained in the C language library environment. The program analysis tools include but are not limited to software debugger tools, software memory leak detection tools, computer hardware cache simulation tools, software profiling tools, and software execution coverage tools.

One novel method of using the present invention is for the user to write software development tools for dynamic instrumentation. The present invention allows simple insertion of instrumentation code during the execution process by methods well known to those skilled in the art such as dynamic binding. Insertion of instrumentation code enables the interception of system support requests, which easily permits new tracing and analysis of the execution flow of software instructions and also enables an incremental execution flow. The present invention allows the user to create functionality such as memory checking and insertion of watchpoints, for refined analysis of instruction execution. Watchpoints are software constructs which indicate when a specific datum in a user application software program changes. Those skilled in the art will appreciate the application of dynamic binding of instructions by the use of the present invention.

Since the present invention is dynamic, when the augmented loader is invoked the instrumented object code module contains information about the actual execution path. Since the execution path is known the instrumentation, profiling, or monitoring code will only need to access the necessary dynamically loadable libraries, such as the C programming language dll library.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

As shown in the drawings for purposes of illustration the present invention is a software development tool for dynamic instrumentation or monitoring of a user process and executes under the same computer environment as that of the user process thereby preserving the flow of execution of the user code. Prior software development tools have created a copy of the user process executable image and the inserted instrumentation code in computer memory which resulted in an executable image that did not preserve the execution flow of the original user object module.

The present invention is a dynamic software development tool that is introduced at the run-time stage of the compilation and execution of a software program. The present invention emulates software instructions by recognizing instructions which must be changed to execute as required and by substituting them with equivalent instructions which may be easily augmented with instrumentation or monitoring instructions for improving the software development process. The present invention can suspend and resume the execution of a user code process and thereby insert instrumentation or monitoring code into the user process. During the run-time stage computer machine code is created which is executed using the hardware registers. The present invention improves software development analysis by dynamically instrumenting or monitoring the user process within the user process computer environment and under the user process execution flow.

The present invention operates in computer memory which, in addition to the dynamic method of execution of the present invention, enables faster emulation than in prior art.

Additionally by treating the user process instructions as data the present invention is flexibly able to emulate a variety of code sequences. Prior emulation tools were constrained to operate on discrete code units such as software procedures. Those skilled in the art will appreciate that since the present invention operates under the user process instruction flow and treats user process instructions as data, the emulation tool may cross procedure boundaries while executing sequences of user process code.

The software development tool is a form of computer system compiler technology. For a general discussion of existing compiler and emulation tool technology, see *Principles of Compiler Design*, by Alfred V. Aho and Jeffrey D. Ullman (Addison-Wesley, 1977), which is herein incorporated by reference in its entirety.

Emulation

Emulation involves modeling a computer in software. The present invention emulates the original application code by fetching, decoding, and translating portions of code into instructions for modeling the original computer environment in software. During execution on some operating systems such as Unix™, a process can spawn a new process which may take control of the flow of execution and therefore the original process may no longer be in control of execution. The system call and signal instructions are instructions which can spawn a new process. The present invention may intercept system calls and signals and translate them as needed to maintain the emulated execution flow within the original user process.

During traditional execution the real hardware register locations will be accessed by the user process. For example, adding 2+3 and storing the result might be represented in a traditional hardware register file by "ADD r7, r8, r31". This representation would be accurate if register 7 contained the value "2" and register 8 contained the value "3" and if the total "5" were stored in register 31. The traditional hardware register file would contain the following result of the "ADD" operation.

|     |     |
| --- | --- |
| . | |
| . | |
| . | |
| r7 | 2 |
| r8 | 3 |
| . | |
| . | |
| r31 | 5 |

An emulation register file for a computer with thirty-two hardware registers may be represented by a declaration of an array data structure "reg[32]". Here the array "reg" contains thirty-two long integer values. The "cpu" program represents an emulation register file. Assuming that cpu.reg[7] contains 2 and cpu.reg[8] contains 3, the "load", "load", "add", and "store" commands will load the values of cpu.reg [7] and cpu.reg[8], add their values, and store the sum in cpu.reg[31]. A sample "cpu" emulation register file follows.

```
Struct{
long int reg[32];
.
.
.
}cpu
cpu.reg[31]=cpu.reg[7] + cup.reg[8];
load
load
add
store
```

The present invention may be implemented in a computer as a software development tool for emulation that substitutes instructions in a user process and that executes in memory at run-time. The memory may maintain computer environment state values including the contents of the hardware registers, condition codes to direct stages of execution, and hardware-specific parameters to direct the execution process.

The present invention may also operate before the user process has begun execution. When the present invention execution precedes the user process execution, the state value loader loads initial state register values for the bootstrap loader into the computer memory instead of loading the current state register values. The state value loader maintains the initial state register values for the bootstrap loader to later re-load into the memory of the user process.

An alternative embodiment of the present invention for use when the user process has begun to execute may comprise including the bootstrap loader and the bootstrap software code in the computer system operating system loader. Those skilled in the art will appreciate that since the computer system operating system loader sets up the initial user process state values for both the hardware registers and computer memory a specific computer implementation could be integrated to perform the bootstrap functions.

Dynamic Software Development Tool

Computer software development tools have been used in applications which include feedback-directed optimization using dynamic or static re-compilation, hardware simulators, and software debugging. Feedback-directed optimization is the process whereby information about critical execution paths in a software program is delivered to a computer YEO instrumentation, profiling, or monitoring tool for use in further instrumentation techniques by the tool. The feedback-directed information can be incorporated into the optimization process via dynamic or static re-compilation of the user's code. That is, the instrumentation code may be incrementally re-generated and re-executed in an incremental fashion, with appropriate changes to optimize the execution of the object code module. The re-generation is based on the results of the previous iteration. In the present invention profiling or monitoring of instrumented code is done dynamically, that is while the program is incrementally executing, and does not require special re-compiling and re-linking.

Software debugging is enabled by the process of inserting specific instrumentation or monitoring code that logs information useful in software development analysis for specific 20 computer instructions known to be susceptible to software programming errors. Procedures that manipulate the use of computer memory can inadvertently change memory locations which are used by other instructions and thereby exceed the boundary conditions of allocated memory locations. Therefore, procedures that manipulate the use of computer memory such as malloc or free, are good candidates for special software debugging monitoring.

Hardware simulation is the process by which the software program is re-compiled with instrumentation or monitoring tool code to create an object module of the user's code that will execute according to computer machine instructions or features of a different computer environment than that on which the code was originally developed. The different computer environment is typically one that is substantially similar to the original computer environment. The process of generating object code targeted to run on a different computer allows simulation of execution on other hardware platforms. That is, the computer-specific hardware features are created in the instrumentation or monitoring tool code and inserted into the user's application code. In the preferred embodiment of the present invention, during hardware simulation the instrumentor will change instructions created by the emulator. The augmented user process is then executed for the purpose of analyzing the flow of user application instructions on the original machine in a manner in which it would execute on a different computer environment.

Some examples of hardware simulation features include, but are not limited to, the analysis of bus and memory latency, and the analysis of cache architecture such as set associative, direct map, multiple levels of cache, and processor interconnection networking. Those skilled in the art will appreciate the use of hardware simulation for analysis of these features.

In the following detailed description and in the several figures of the drawings, like elements are identified with like reference numerals.

Figure 1:
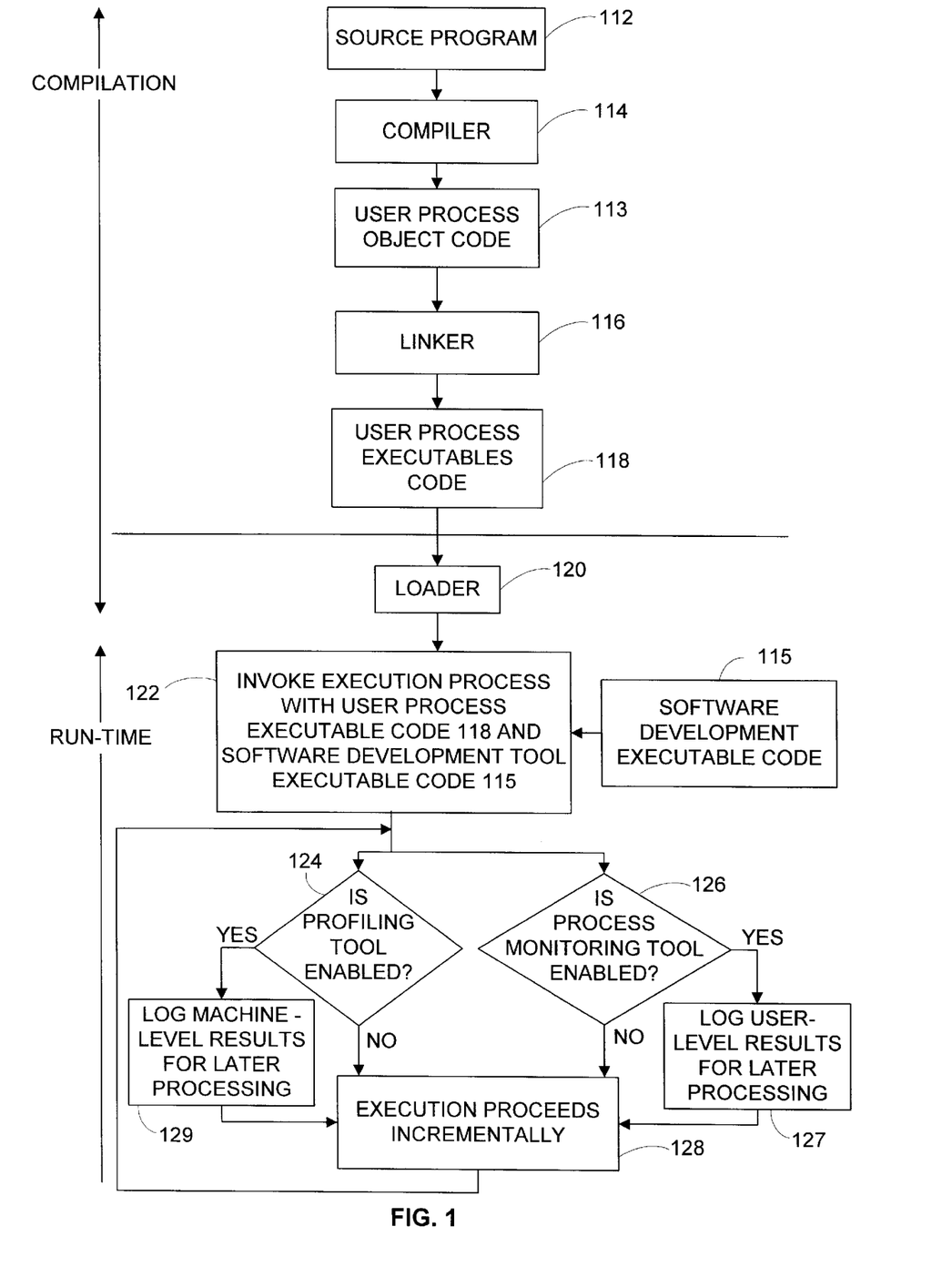
FIG. 1 is a block diagram of the compilation-time and run-time computer execution process.

In FIG. 1 the software environment of the invention is illustrated using a source program 112 which can be created in a computer programming language such as C or C++. The source program is manipulated by a compiler 114 that translates programming language instructions into machine code instructions. The resulting machine code instructions are often called object code and are illustrated herein by user process object code 113. Object code includes instructions for executing on a specific computer processor. Therefore the user process object code 113 is in a format which can be translated by a linker 116. In order to execute the object code it must be combined with one or more object code modules to create executable machine code, and is herein illustrated by user process executable code 118. This combining process is called linking. When the linker 116 processes the object code it resolves any interconnection references and creates executable code.

In FIG. 1 a loader 120 is shown that invokes the execution process herein illustrated in step 122 by using the user process executable code 118 and the software development executable code 115. The loader 120 activity represents the transition from the compilation process to the run-time process. In one embodiment of the present invention, during run-time a test may be executed to determine if a profiling tool is enabled 124 that uses computer machine-level information to adjust the source program execution path. In another embodiment of the present invention a test may be conducted to determine if a process monitoring tool is enabled 126 that uses user-level information to monitor program execution. If the profiling tool is enabled 124 the machine-level results of the execution will be logged for later processing 129, and as illustrated in step 128 execution will incrementally proceed. If the process monitoring tool is enabled 126 the user-level results of the execution will be logged for later processing 127, and as illustrated in step 128 execution will incrementally proceed. The incremental execution process 128 includes taking feedback information from the logged results of the profiling tool and the process monitoring tool. If neither tool is enabled, the processing of the source program will proceed 128 normally to execute through the computer system.

Figure 2A:
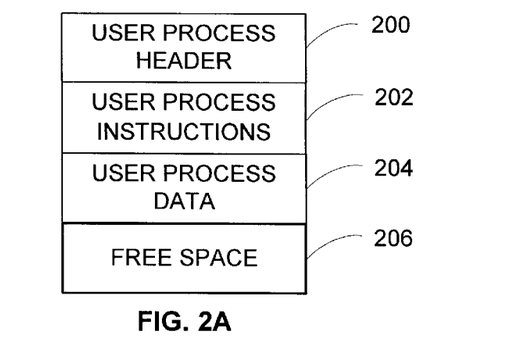
FIGS. 2A–2D are block diagrams of the computer memory configuration during execution.
Figure 2B:
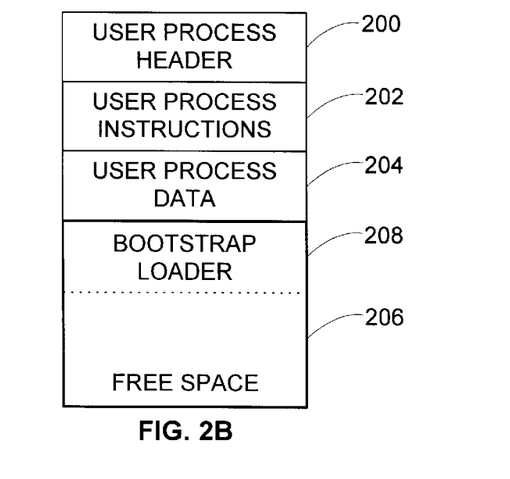
Figure 2C:
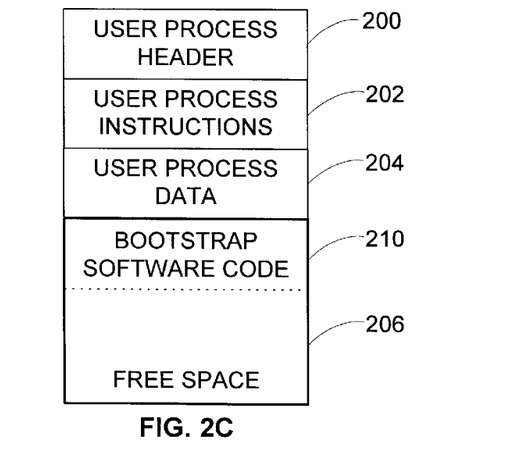

In FIGS. 2A–2D the changing computer memory configuration is illustrated. In FIG. 2A, prior to invocation of the emulation tool, the user process header 200, the user process instructions 202, the user process data 204 and the remaining free space 206 represent a user process memory configuration. In FIG. 2B, the bootstrap loader 208 has been invoked and has taken part of the free space 206. The user process header 200, the user process instructions 202, and the user process data 204 share user process 300 memory with the bootstrap loader 208. After the bootstrap loader 208 begins execution, the bootstrap software code 210 is invoked, as shown in FIG. 2C. The user process header 200, the user process instructions 202, and the user process data 204 continue to share user process 300 memory now with the bootstrap software code 210. The bootstrap software code 210 has taken some of the memory of the remaining free space 206 to load the ancillary control code 212.

Figure 2D:
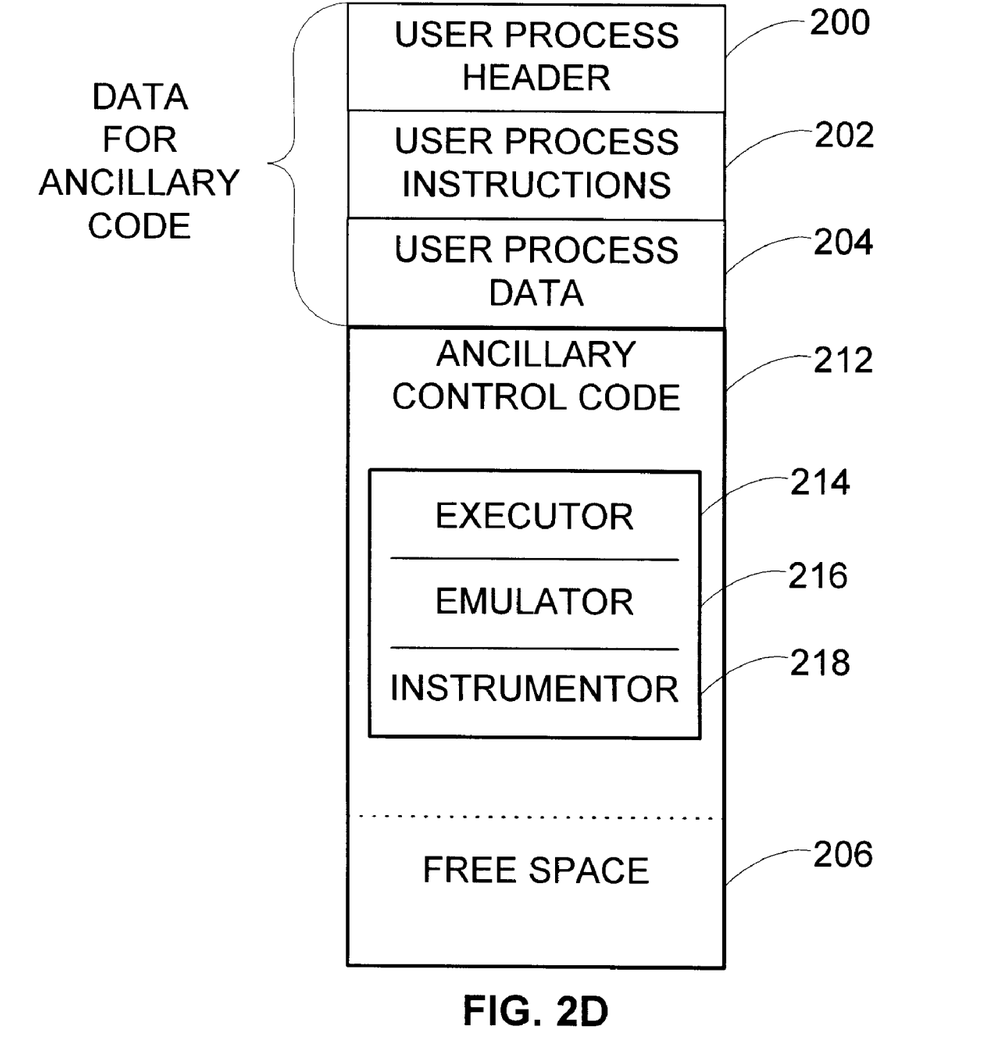

Finally, in FIG. 2D, the ancillary control code 212 has been invoked. The ancillary control code 212 includes an executor 214, an emulator 216, and an instrumentor 218. The emulator 216 maintains the register state values the user process would have generated without the invocation of the software development tool. The emulator 216 also substitutes the instructions of the user process 300 while generating the same results as would have occurred without the invocation of the software development tool, and treats the user process code as data. The instrumentor 218 executes within the user process 300 and adds instructions which may augment the user instructions for purposes such as monitoring or profiling. Finally, the executor 214 determines whether to invoke the emulator 216 or the instrumentor 218, using the instructions of the user process 202 and the user process data 204 that are both treated as data. The ancillary control code 212 and its elements operate by using the user process header 200. The ancillary control code 212 and its elements have taken over more of the remaining free space 206.

The present invention may also include a state value loader that loads state register values for the user process into the computer memory and maintains the state register values for the user process for later re-loading into the memory of the user process. Additionally, when the user process is invoked for execution, the state value loader loads state register values for the loader into the computer memory and maintains the state register values for the loader for later re-loading into the memory of the user process.

Figure 3A:
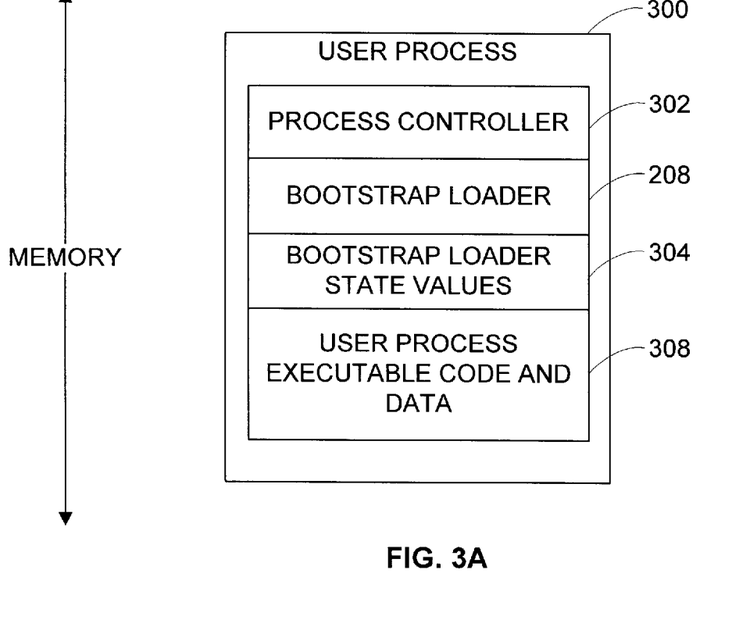
FIGS. 3A–3C are block diagrams of the modified user process and the process controller.
Figure 3B:
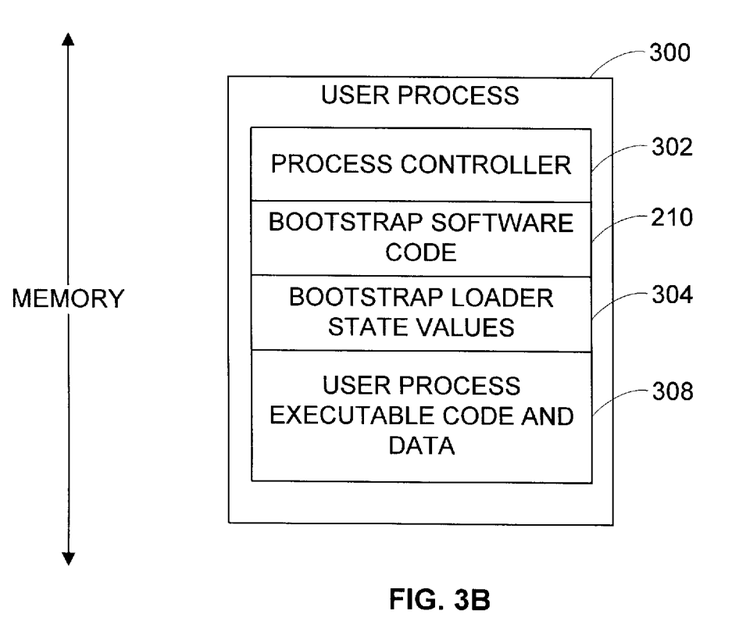

In FIGS. 3A–3C the contents of the user process during execution is illustrated. In FIG. 3A the process controller 302 establishes control over the user process 300 by suspending execution of the user process 300. The state value loader loads the state register values for the user process into the computer memory. The process controller 302 then invokes the bootstrap loader 208 and the state value loader re-loads the bootstrap loader state values 304 into the memory of the user process 300. When the bootstrap loader 208 and the bootstrap loader values 304 are inserted into the user process 300 in FIG. 3A, they share the user process 300 with the user process executable code and data 308. In FIG. 3B the invoked bootstrap loader 208 loads the bootstrap software code 210 into the memory of the user process 300 and uses the bootstrap loader state values 304 to execute the bootstrap software code 210. The process controller 302 and the user process executable code and data 308 continue to execute in the user process 300.

Figure 3C:
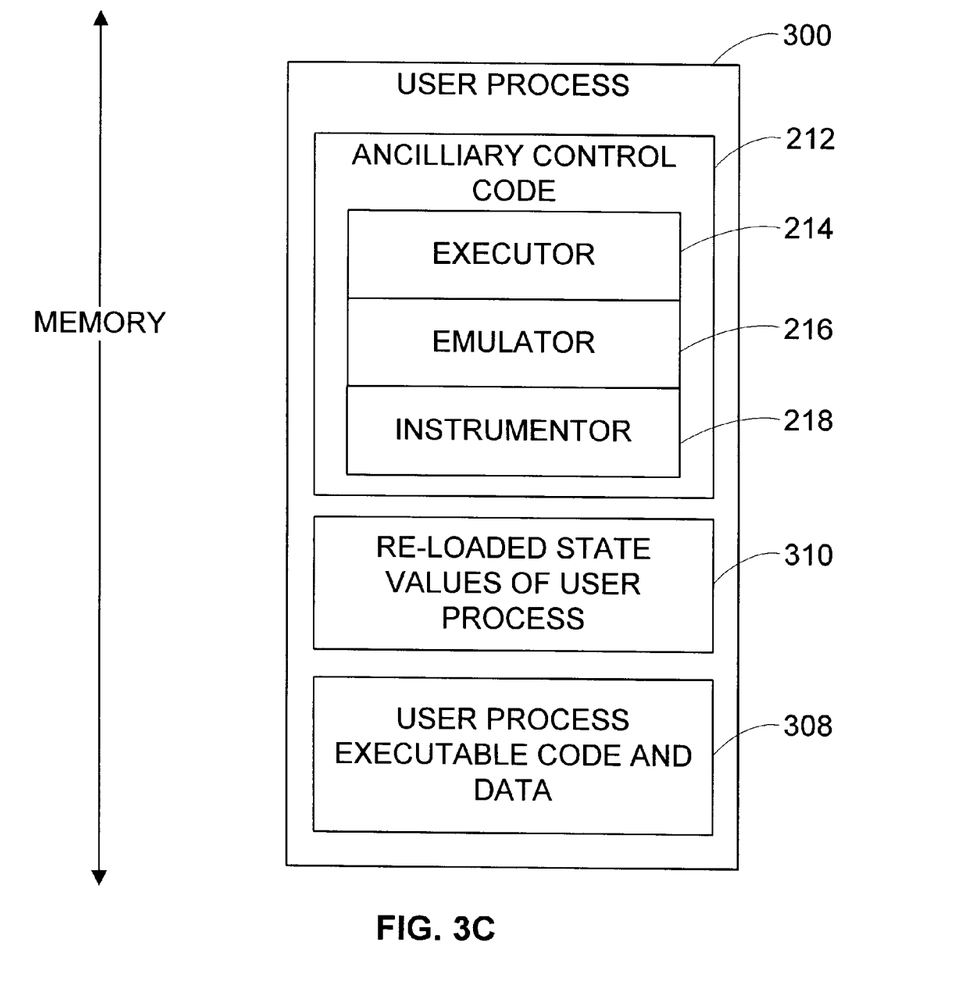

In the transition from FIG. 3B to FIG. 3C the state value loader re-loads the state register values of the user process 310 into the memory of the user process 300. Thereupon, the process controller 302 releases control of the user process 300 and execution in the user process 300 is resumed. The bootstrap software code 210 executes in the user process 300 and attaches the ancillary control code 212 to the user process 300. The executing bootstrap software code 210 in the user process 300 transfers execution to the ancillary control code 212 in the user process 300.

In FIG. 3C, the ancillary control code 212 substitutes instructions in the user process using the state values 310 in the memory of the user process 300. The elements of the ancillary control code 212 include the executor 214, the emulator 216, and the instrumentor 218. The ancillary control code 212 includes an emulator 216 that maintains the register state values the user process 300 would have generated without the insertion of the software development tool. The emulator 216 also executes substituted instructions, using the user process code and data 308 that are treated as data, to generate the same results as if the software development tool had not been inserted. The ancillary control code 212 may also include an instrumentor 218 that executes within the user process 300 and adds instructions which may augment the user instructions for purposes such as monitoring or profiling. Finally, the ancillary control code 212 may include an executor 214 that determines whether to invoke the emulator 216 or the instrumentor 218 using the instructions of the user process 308 that are treated as data. The ancillary control code 212 executes with the re-loaded state values of the user process 310 and uses the user process executable code and data 308 as data.

Figure 4A:
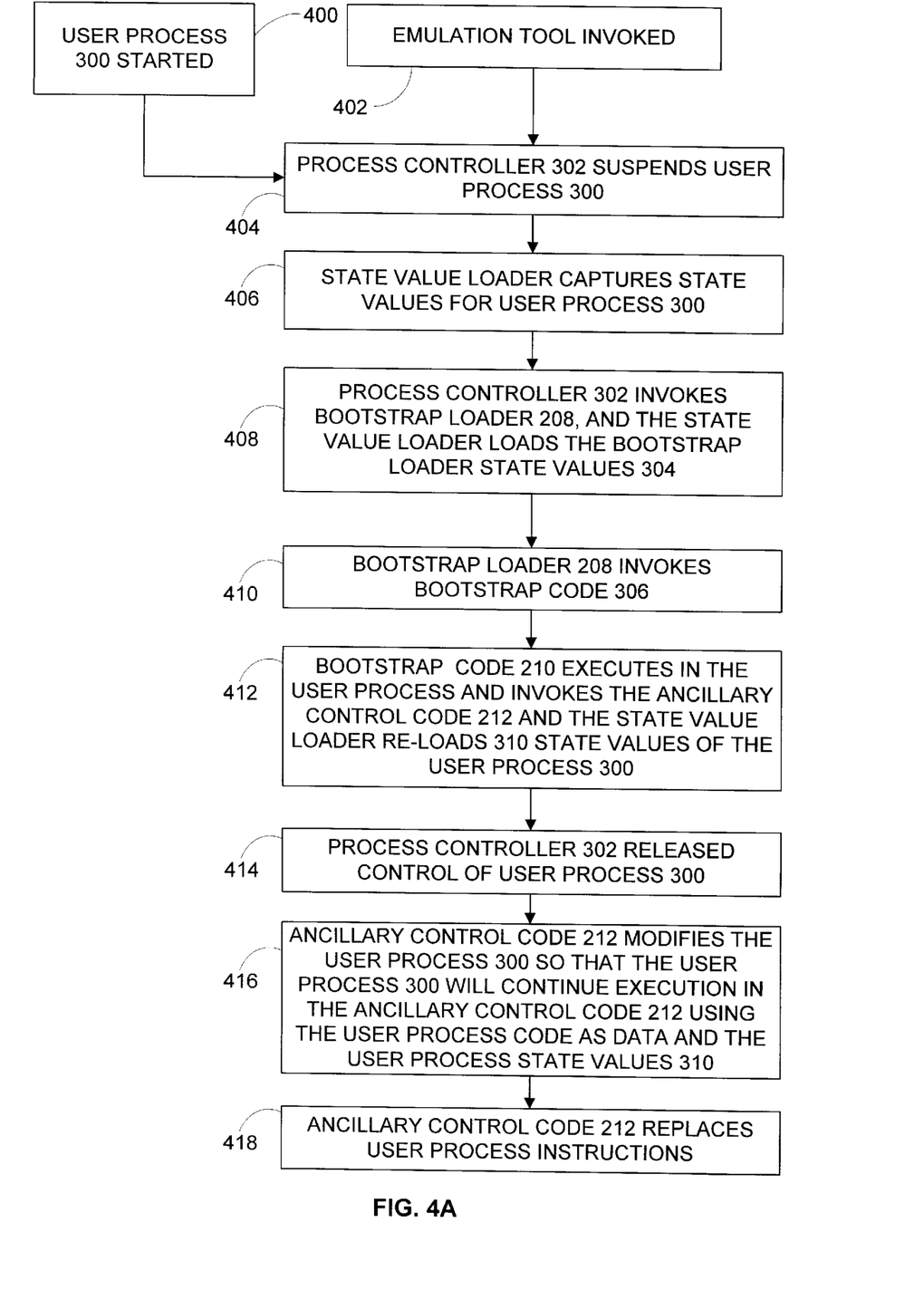
FIG. 4A is a flow diagram of the process used to insert the emulation tool into the user process.

In FIG. 4A the process used by the emulation tool includes in step 400 starting the user process 300 and in step 402 invoking the emulation tool. In step 404, the process controller 302 suspends the user process 300 which initiates action from the emulation tool. In step 406 the state value loader captures the machine state of the register values for the user process 300 and for later re-loading into the memory of the user process 300. Having taken control of the user process 300 by suspending the user process 300, in step 408 the process controller 302 now invokes the bootstrap loader 208 and the state value loader loads the bootstrap loader state values 304. In step 410 the bootstrap loader 208 then loads bootstrap software code 210 into unused portions of the memory of the user process 300. In step 412 the state value loader re-loads 310 the state values of the user process 300 into the memory of the user process 300. In step 414 the process controller 302 releases control of the user process 300. The bootstrap software code 210 executes in the user process and attaches the ancillary control code 212 to the user process 300. The executing bootstrap software code 210 transfers execution to the ancillary control code 212 in the user process 300.

The released user process 300 now resumes execution and in step 416 the ancillary control code 212 modifies the user process 300 so that the user process 300 will continue execution in the ancillary control code 212 using the user process code as data and the user process state values 310. In step 418, the present invention includes ancillary control code 212 that substitutes instructions in the user process 300.

Figure 4B:
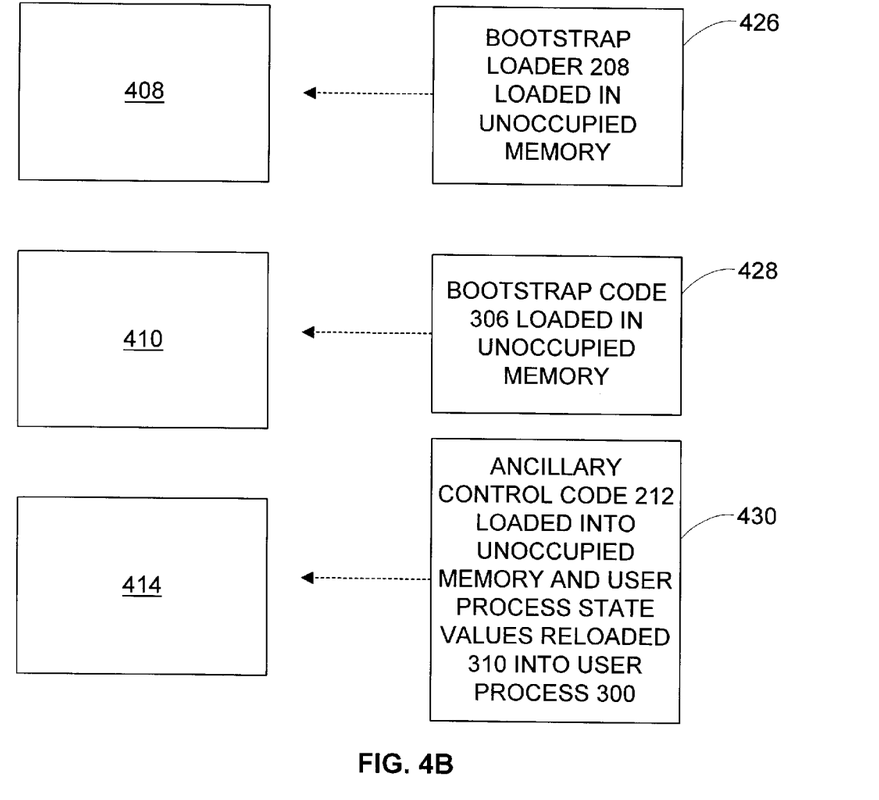
FIG. 4B is block diagram of data structures which combine to form the user process executable code.

The memory of the user process 300 undergoes change during the execution of the emulation tool. In FIG. 4B the changes in the memory of the user process 300 are illustrated. In step 426 the bootstrap loader 208 is loaded into the unoccupied free space 206 of the memory of the user process 300. In step 428 the bootstrap software code 210 is loaded into the unoccupied free space 206 of the memory of the user process 300. In step 430 the ancillary control code 212 is loaded into the unoccupied free space 206 of the memory of the user process 300, and the user process state values are re-loaded 310 into the user process 300.

Figure 4C:
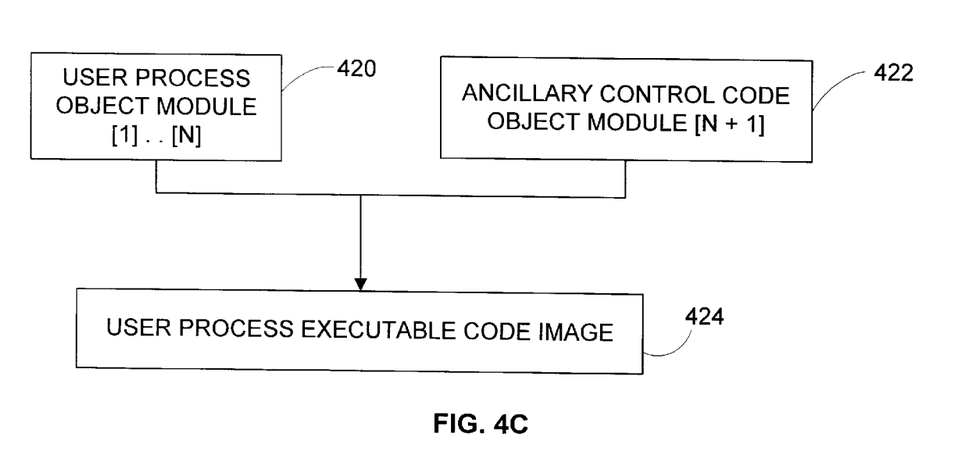
FIG. 4C is a block diagram of the changes to the user process memory during execution.

The file structures in FIG. 4C illustrate that all of the user process object modules 420 are combined with the ancillary control code object modules 422 to create a combined user process executable code image 424. The computer files execute in memory and include state register values, data, and code by which they are executed. The combined executable image 424 allows the software development tool to execute under the user process 300 execution flow. The combined executable image 424 is executed by using state register values of the user process code that have been modified to allow execution of the ancillary control code modules 422 in the memory of the user process. The object module of the ancillary control code 422 substitutes instructions for user process instructions and maintains computer state register values the user process would have generated without the attached ancillary control code module 422. The object module of the ancillary control code 422 further executes at least one instruction whereby the executed results are the same results that would have been generated without the insertion of the software development tool.

Although a specific embodiment of the invention has been described and illustrated, the invention is not to be limited to the specific forms or arrangement of parts so described and illustrated. The invention is limited only by the claims.

What is claimed is:

1. A computer implemented method for emulating software that alters program execution at run-time, and that attaches ancillary control code to a user process loaded in computer memory comprising, a. invoking execution for at least one code instruction from the user process loaded in the computer memory and suspending the execution of the user process;

b. loading state values for the suspended user process into the computer memory and moving the loaded state values for the user process into unoccupied areas of the memory for the user process;

c. loading ancillary control code into unoccupied areas of the memory for the user process and modifying the user process state values to execute the ancillary control code when the user process is resumed;

d. restoring the modified state values for the user process, releasing suspension of the user process, and transferring execution to the ancillary control code; and e. establishing by the ancillary control code an emulation environment that substitutes and executes at least one user process instruction by using the modified state values of the user process and by treating the user process instructions as data, and maintaining the register state values the user process would have generated without attaching the ancillary control code.

2. A computer implemented method as set forth in claim 1, further comprising, a. loading bootstrap software code into unoccupied areas of the memory for the user process when the user process execution has been suspended, and modifying the user process state values to execute the bootstrap software code for use when the user process is resumed;

b. executing the bootstrap software code when the modified user process execution is resumed, the bootstrap software code further loading the ancillary control code in the user process and transferring execution of the user process to the ancillary control code.

3. A computer implemented method as set forth in claim 1, further comprising,
   a. loading process monitoring code instructions in the user process that are jointly executed with the user process code instructions whereby the joint execution is invoked by the ancillary control code; and
   b. collecting the results of the execution of the user process code instructions and the process monitoring code instructions.

4. A computer implemented method as set forth in claim 1, wherein when the ancillary control code establishes an emulation environment for substitution and execution of at least one user process instruction, and at least one user process instruction is executed as it would have executed on a different computer machine.

5. A computer implemented method as set forth in claim 1, further comprising,
   a. loading execution profiling code in the user process and jointly executing the user process and the profiling code whereby the joint execution is invoked by the ancillary control code; and
   b. invoking another execution of the ancillary control code using the results of the joint execution.

6. A computer implemented method as set forth in claim 1, further comprising testing the memory state of the user process to detect uninitialized code access.

7. A computer implemented method as set forth in claim 1, further comprising testing the memory state of the user process to collect the memory state for memory-sensitive procedure calls.

8. An improved computer implemented software development tool for emulation that substitutes instructions in a user process that executes in memory at run-time, and the memory maintains state values and the computer system maintains state register values comprising;
   a. ancillary control code that substitutes instructions in the user process using the state values in the memory of the user process;
   b. a loader that manipulates the memory states of the user process enabling execution of the ancillary control code in the user process, and loads the ancillary control code into the user process;
   c. a state value loader that when invoked loads state register values for the user process into the computer memory and maintains the state register values for the user process for later re-loading into the memory of the user process; and when the user process execution is invoked, the state value loader loads state register values for the loader into the computer memory and maintains the state register values for the loader for later re-loading into the memory;
   d. a process controller that establishes control over the user process and releases control of the user process, and when the process controller establishes control over the user process by suspending execution of the user process, the state value loader loads the state register values for the user process into the computer memory, the process controller invokes the loader and the state value loader re-loads the state values of the loader;
   e. wherein when the process controller releases control of the user process and resumes execution of the user process, the state value loader re-loads the state register values of the user process into the memory of the user process, the loader executes and attaches the ancillary control code to the user process, and the loader transfers execution of the user process to the ancillary control code; and
   f. the ancillary control code further comprises, an emulator that maintains the register state values the user process would have generated without the insertion of the software development tool, that executes at least one instruction, and that generates the same results that would have been generated without the insertion of the software development tool, an instrumentor that executes within the user process and that adds instructions to the user process, and an executive that determines whether to invoke the emulator or the instrumentor using the instructions of the user process that are treated as data.

9. A computer implemented software development tool as set forth in claim 8, wherein the loader further comprises,
   a. a bootstrap loader that loads bootstrap software code into unused portions of the memory of the user process and that manipulates the memory states of the user process enabling execution of the ancillary control code in the user process, and loads the ancillary control code into the user process;
   b. when the user process execution is invoked, the state value loader loads state register values for the bootstrap loader into the computer memory and maintains the state register values for the bootstrap loader for later re-loading into the memory of the user process;
   c. when the process controller establishes control over the user process, the process controller invokes the bootstrap loader and the state value loader reloads the state values of the bootstrap loader into the memory of the user process, the bootstrap loader loads the bootstrap software code into the memory of the user process; and
   d. when the process controller releases control of the user process and resumes execution of the user process; the bootstrap software code executes in the user process, attaches the ancillary control code to the user process, and transfers execution of the user process to the ancillary control code.

10. A computer implemented software development tool as set forth in claim 8, wherein the process controller is included in an operating system loader in the computer system.

11. A computer implemented software development tool as set forth in claim 8, wherein the ancillary control code jointly executes the user process instructions and process monitoring code instructions, and the process monitoring code instructions collect the results of the joint execution.

12. A computer implemented software development tool as set forth in claim 8, wherein the ancillary control code further comprises a hardware simulator that uses substitution instructions that will execute on a different computer machine than the computer system, and at least one user process instruction is executed using the hardware simulator.

13. A computer implemented software development tool as set forth in claim 8 wherein the ancillary control code includes a profiler, that analyzes results of the re-loaded memory state values of the user process, that uses the results to modify the execution instructions for the ancillary control code, and that directs the process controller to establish control of the user process and release control of the user process for the purpose of further execution of the modified ancillary control code.

14. A computer implemented software development tool as set forth in claim 8, wherein the ancillary control code includes a memory checker that tests the memory state values for the user process to detect uninitialized code access.

15. A computer implemented software development tool as set forth in claim 8, wherein the ancillary control code includes a memory checker that tests the memory state values for the user process to detect access in the user process to memory-sensitive procedure calls prior to their execution, and collects the state of the memory-sensitive procedure calls.

16. An improved computer implemented software development tool for emulation that substitutes instructions in a user process that executes in memory at run-time, and the memory maintains state values and the computer system maintains state register values comprising;
   a. ancillary control code that substitutes instructions in the user process using the state values in the memory of the user process;
   b. a loader that manipulates the memory states of the user process enabling execution of the ancillary control code in the user process, and loads the ancillary control code into the user process;
   c. a state value loader that when invoked loads state register values of the computer system into the computer memory and maintains the state register values for the computer system for later re-loading into the memory of the user process; and when the user process execution is invoked, the state value loader loads state register values for the loader into the computer memory and maintains the state register values for the loader for later re-loading into the memory;
   d. a process controller that establishes control over the user process and releases control of the user process, and when the process controller has established control of the user process before the user process has begun execution, the state value loader loads the state register values of the computer system into the computer memory, the process controller invokes the loader and the state value loader re-loads the state values of the loader into the memory; and
   e. wherein when the process controller releases control of the user process, the state value loader re-loads the state register values of the computer system into the memory of the user process, the loader executes and attaches the ancillary control code to the user process, the loader transfers execution of the user process to the ancillary control code; and
   f. the ancillary control code further comprises, an emulator that maintains the register state values the user process would have generated without the insertion of the software development tool, that executes at least one instruction, and that generates the same results that would have been generated without the insertion of the software development tool, an instrumentor that executes within the user process and that adds instructions to the user process, and an executive that determines whether to invoke the emulator or the instrumentor using the instructions of the user process that are treated as data.

17. A computer-readable memory device for use by a computer system, having state register values, user process code, ancillary control code, and a loader, the data comprising:
   a. a first array corresponding to computer state register values for the user process code;
   b. an executable image of the user process code, wherein the state register values of the user process code have been modified to allow execution of the ancillary control code in the memory of the user process;
   c. a second array corresponding to the modified state register values for the user process code, wherein the cells of the second array comprise memory location information for the loader; and
   d. an object module image of the ancillary control code that substitutes instructions for user process instructions and that has been attached to the user process executable image further comprising, emulator code that maintains computer state register values the user process would have generated without the attached ancillary control code, that executes at least one instruction, and that generates the same results that would have been generated without the insertion of the software development tool, instrumentor code that executes within the user process and that adds instructions to the user process, and executive code that determines by using the process code as data whether to invoke the emulator code or the instrumentor code.

18. An article of manufacture comprising a computer product for attaching ancillary control code to an executing user process loaded in computer memory, further comprising a program storage medium wherein,
   a. computer readable program code invokes execution for at least one code instruction from the user process loaded in the computer memory;
   b. computer readable program code suspends the execution of the user process;
   c. computer readable program code loads state values for the user process into the computer memory and moves the state values for the user process into unoccupied areas of the memory of the user process;
   d. computer readable program code loads ancillary control code into the unoccupied areas of the memory of the user process and modifies the user process state values to execute the ancillary control code when the user process is resumed;
   e. computer readable program code resumes execution of the modified user process and passes execution control of the user process to the ancillary control code; and
   f. computer readable program code establishes by the ancillary control code an emulation environment that substitutes and executes at least one user process instruction, using the state values loaded into the unoccupied areas of the memory of the user process, using the user process instructions as data to create the substitution instructions, and logging the register state values the user process would have generated without attaching the ancillary control code.

* * * * *

UNITED STATES PATENT AND TRADEMARK OFFICE
CERTIFICATE OF CORRECTION

PATENT : 5,911,073

DATED : June 8, 1999

INVENTOR(S) : James S. Mattson Jr., Lacky V. Shah & William B. Buzbee

It is certified that error appears in the above-identified patent and that said Letters Patent is hereby corrected as shown below:

Column 2, line 7, "d11" should read --dll-- (not bold).

Column 4, line 17, "d11" should read --dll-- (not bold).

Column 6, line 63, "20" should be deleted.

Signed and Sealed this

Eighth Day of February, 2000

Attest:

Q. TODD DICKINSON

Attesting Officer

Commissioner of Patents and Trademarks